Oct. 26, 1954

C. H. CURRY ET AL 2,692,758

HOLE REAMER

Filed April 24, 1950

Charles H. Curry
Anthony Shacikoski
INVENTORS

Oct. 26, 1954  C. H. CURRY ET AL  2,692,758
HOLE REAMER
Filed April 24, 1950  2 Sheets-Sheet 2
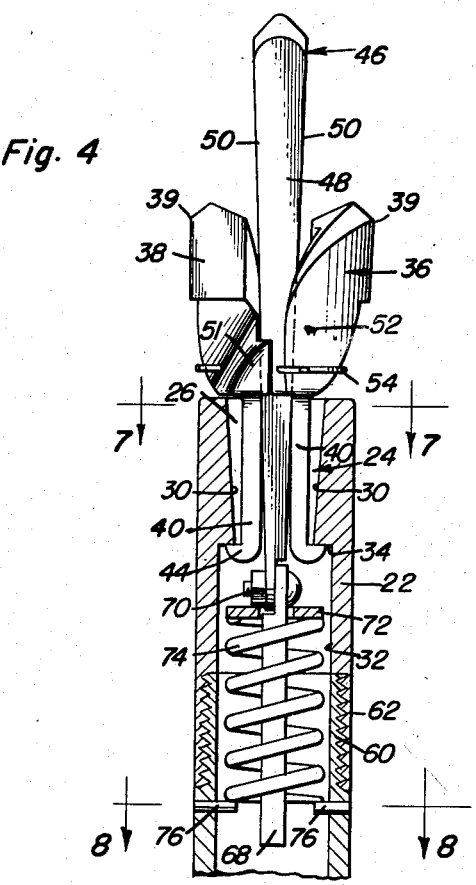
Fig. 4
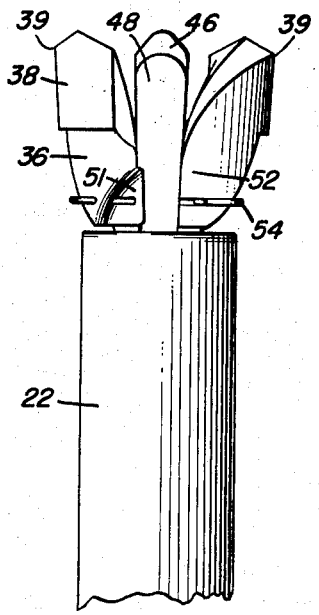
Fig. 5
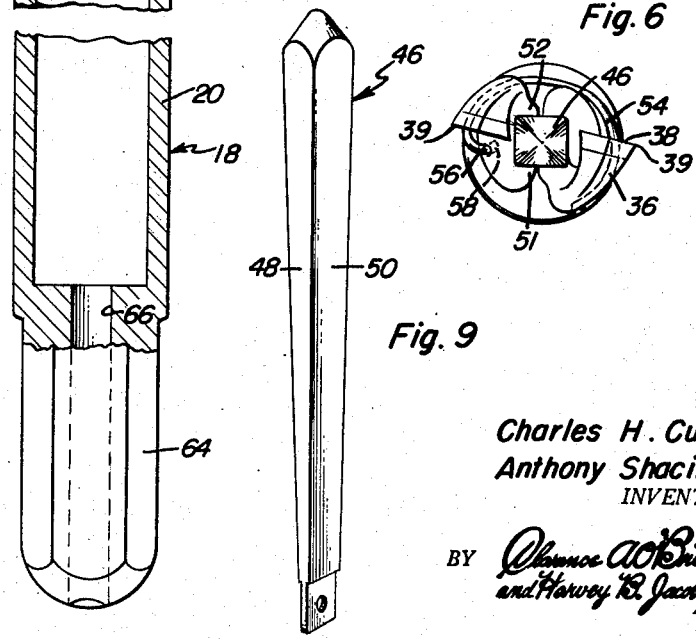
Fig. 6
Fig. 9
Charles H. Curry
Anthony Shacikoski
INVENTORS
BY
Attorneys

Patented Oct. 26, 1954

2,692,758

UNITED STATES PATENT OFFICE 2,692,758

HOLE REAMER

Charles H. Curry, New Kensington, and Anthony Shacikoski, Avonmore, Pa.

Application April 24, 1950, Serial No. 157,738

1 Claim. (Cl. 255—76)

This invention comprises novel and useful improvements in reaming tools, and more particularly pertains to a reaming device for enlarging the inner end of a drilled hole.

An important object of this invention is to provide a reaming device for enlarging the inner blind end of a drilled hole.

Another object of this invention is to provide a reaming device which will enlarge the inner end of the hole responsive to the advancement of the reamer toward the blind end of the hole so as to provide relatively diverging side walls at the blind end of the hole.

A further object of this invention is to provide a reaming device in which the bits will be retracted as the reamer is drawn out of the hole.

Yet another object of this invention is to provide a reaming device, in accordance with the foregoing objects, which device is of simple construction; which may be readily assembled and disassembled for purposes of repair or replacement; and which is durable and highly efficient for the purposes intended.

An important feature of this invention resides in the provision of a reamer head portion having a multi-sided axial bore, with bits having laterally movable shanks extending into the bore, and a tapered, axially movable key slidably received in the bore between the shanks and between the bits to move the latter apart laterally when the key engages the blind end of a hole so that the bits are moved into reaming engagement with the side of the hole for reaming operation.

These, together with various ancillary objects and features are attained by this device, a preferred embodiment of which has been illustrated by way of example only in the accompanying drawings, wherein:

Figure 4 is a longitudinal sectional view of the reaming device partly broken away and with the parts in normal position;

Figure 5 is a fragmentary side elevational view of the head portion of the reaming device showing substantially the position of the bits at the end of a reaming operation;

Figure 6 is an end elevational view of the reaming device;

Figure 9 is a perspective elevational detail view of the tapered key, and

Figure 1:
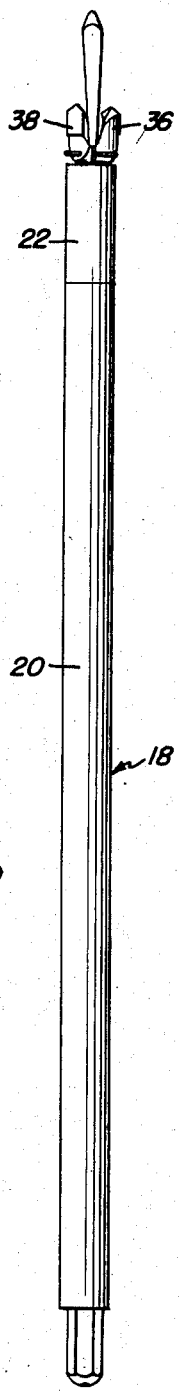
Figure 1 is a side elevational view of the complete reaming device with the parts in normal position.
Figure 2:
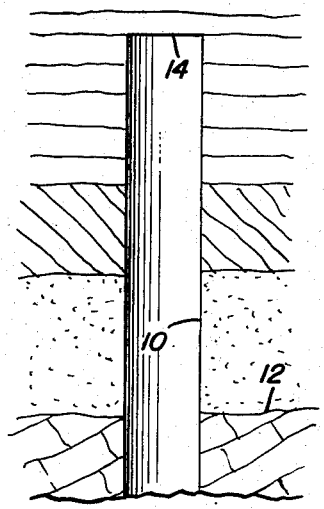
Figure 2 is a sectional view through a drilled blind end hole in a stratified material prior to being reamed.
Figure 3:
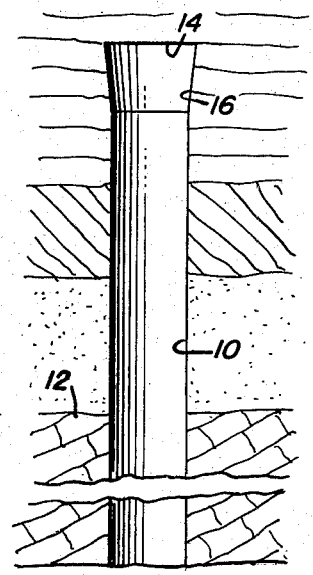
Figure 3 is a sectional view through the hole shown in Figure 2 after being reamed.
Figure 10:
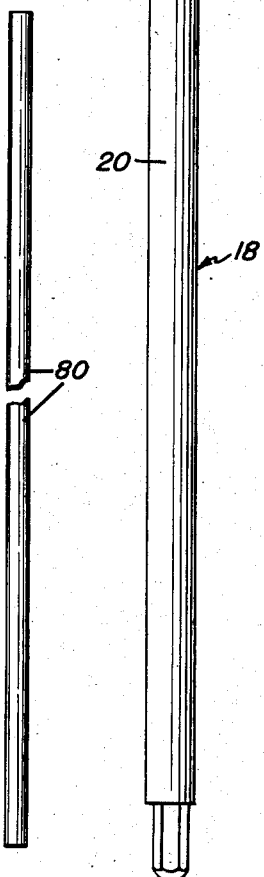
Figure 10 is a view in side elevation, partly broken away, of the push rod.

In order to support the roof of mines and the like, which roofs are generally formed in stratified layers of sedimentary material, it has been found desirable to lock the stratified layers to each other, at various spaced points. For this purpose, a blind end hole 10 is drilled, substantially transversely of the stratified layers 12 and a bolt or shaft (not shown) is secured to the inner end 14 of the hole, the other extremity of the bolt being threaded so that a nut and washer (not shown) may be secured to the threaded end of the bolt, thereby drawing the stratified layers 12 together, forming a more firm roof.

In order to more effectively lock the bolt within the hole 10, it has been found desirable to outwardly flare the hole 10 at the blind end as at 16, a bolt (not shown) having a bifurcated end portion being inserted in the hole 10, the end portion being spread into engagement with the flared end 16 of the hole 10 as by a wedge or the like.

In order to outwardly flare the hole 10, adjacent the blind end 14, there is provided a device for reaming the hole 10, which reaming is responsive to the advancement of the reamer against the end wall 14.

Referring now more specifically to the accompanying drawings wherein like numerals designate similar parts throughout the various views, it will be seen that there is provided a reamer indicated generally by the numeral 18 which consists of a hollow rotary shaft 20 having a front end head portion 22 and adapted to be advanced and retracted in the hole 10.

The head portion 22 consists of a cylindrical casing having a multi-sided axial, reduced bore 24 extending into the front end thereof. For reasons which will become apparent as the following description proceeds, the bore 24 is provided with a pair of parallel and laterally spaced side walls 26 and 28 and a pair of opposed inwardly tapering, forwardly flaring end walls 30 and the other end of the head portion 22 is provided with a preferably circular bore 32 which forms an annular shoulder 34 at the inner end of the reduced bore 24.

Figure 7:
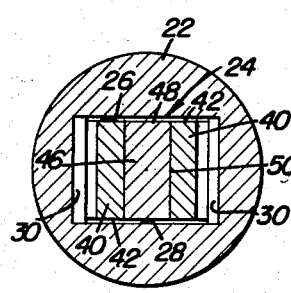
Figure 7 is a transverse sectional view taken substantially on the plane 7—7 of Figure 4.
Figure 8:
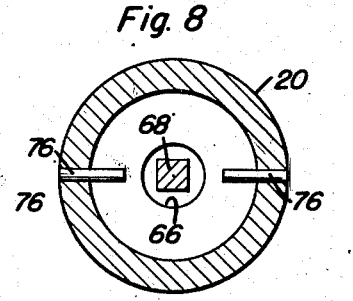
Figure 8 is a transverse sectional view taken substantially on the plane 8—8 of Figure 4.

A pair of laterally spaced bits 36 having substantially radially extending cutting faces 38 and cutting edges 39 are provided at the outer end of said bore 24 with laterally spaced shanks 40, which shanks as best shown in Figures 4 and 7 are substantially rectangular in cross-section. The bits 36 extend forwardly of the head portion 22 outside the reduced bore 24 and are wider than said bore 24 to prevent the bits from entering said bore and for engagement by said head portion 22 and advance therewith. The edges 42 of the shanks 40 are slidably and guidably received between the side walls 26 and 28 so that said shanks 40 are laterally movable relatively in a separative direction into engagement with the end walls 30, the shanks being provided with laterally extending ends 44 which engage behind the annular shoulder 34 so that retraction of the shaft 20 from the hole 10 will retract said shanks 40 and bits 36. A tapered axially movable key 46 extends into the reduced bore 24, between the shanks 40 of the bits 36 and between said bits, the key having a pair of parallel sides 48 which are slidably and guidably received between the side walls 26 and 28 of the reduced bore, and a pair of opposite faces 50 diverging forwardly relatively. It will thus be seen that if the key 46 is moved inwardly into the reduced bore 24 from an outwardly forwardly, extended position that shanks 40 will be moved apart laterally in proportion to the inward movement of the key into the bore, and the bits 36 will be correspondingly moved apart laterally, gradually by the shanks 40 to ream a flare 16 in the hole 10 at the blind end of the hole. In order to further stabilize the bits 36 during the actual reaming process, it is intended that the bits be provided with laterally spaced flanges 51 and 52 which overlie the key 46, and slidably engage the sides 48 thereof.

In order to maintain the shanks 40 engaged with the faces 50 of the key 46, there is provided a resilient coil 54 which embraces the bits 36 and urges the latter toward each other and the shanks into contact with said faces 50, the coil 54 having hooked end portions 56 which are received in recesses 58 in each of the bits 36, whereby the coil is detachably secured to the bits.

The shaft 20 is detachably secured to the head portion 22, by the respective complementary externally and internally threaded end portions 60 and 62 of the shaft and the head, respectively. The shaft 20 has an externally polygonal tail end portion 64 which is adapted to receive the complementary socket end of a drive shaft, not shown. A bore 66 is provided in the end portion 64 for reasons which will become apparent as the following description proceeds.

A guide bar 68 is detachably secured to the key 46, as by the fastening bolt 70, a collar 72 being mounted upon the guide bar 68, and bearing against the fastener 70. A coil spring 74 is axially mounted upon the guide bar 68 and bears against the collar 72, the other end of the spring engaging a pair of inwardly extending detents 76 on the shaft 20, the arrangement being such that the spring 74, collar 72 and fastener 70 act as means to yieldingly urge the key 46 outwardly of the reduced bore 24 into and outwardly, forwardly extending position shown in Figures 1 and 4. In this manner, it will be seen that as the shaft 20 is retracted from the hole 10, the key 46 will be urged outwardly of reduced bore 24 into its forwardly extended position so that the bits 36 may be retracted, thereby permitting the head portion 22 and bits to be completely removed from the hole 10. In the event that the binding between the bits and the key 46 prevent such a removal, the push rod 80 may be inserted through the bore 66 in the shaft 20, and engaged with the end of the guide bar 68, to forcibly urge the key 46 into the inner end wall 14 of the hole 10.

In operation, the reaming device 18 is advanced in the hole 10. When the key 46 abuts the inner end wall 14 of the hole, the shaft 20 may be advanced relative to the key 46 so that the faces 50 will force the shanks 40 apart laterally into flaring relation, gradually, and into engagement with the end walls 30 to gradually move the bits 36 laterally into flaring separative relation in opposition to the coil 54, whereby the flare 16 will be reamed by the cutting edges 39. The angle of the flare 16 will necessarily be the same as the angle of divergence of the faces 50 so that upon initial retraction of the shaft 20 outwardly of the hole 10, the shanks 40 and hence the bits 36 may move along the faces 50 toward the smaller end of the key with lateral movement toward each other in degree compensating for the angle of taper of the flare 16 whereby the bits 36 may be retracted from the flare 16 and the reaming device completely retracted out of the hole 10. The flared, or divergent position of the bits 36 at the end of the reaming operation is shown in Figure 5.

From the foregoing, it is thought that the operation and construction of the device will be readily understood, and further discussion is, therefore, believed to be unnecessary. However, since numerous modifications will readily occur to those skilled in the art after a consideration of the foregoing specification and accompanying drawings, it is not intended to limit the invention to that shown and described, but all suitable modifications may be resorted to falling within the scope of the appended claim.

Having described the invention, what is claimed as new is:

A reamer for advance and retraction in a blind end drill hole comprising a rotary shaft having a bore therethrough, said shaft having a front end head portion, the bore in said head portion being axially reduced and having parallel opposite side walls and forwardly flaring end walls, an internal annular shoulder provided in said head portion at the inner end of said axially reduced portion, a pair of opposite laterally spaced bits extending forwardly from said head portion outside said bore and being wider than said bore to prevent the same from entering said bore and for engagement by said head portion for advance therewith, said bits having cutting edges, a pair of laterally spaced shanks on said bits extending into said bore and slidably fitting between said side walls for lateral guided movement relative to each other and for engagement with said end walls to move said bits into reaming engagement with the side of said hole at said blind end, laterally extending ends on said shanks engaging behind said shoulder, whereby retraction of said shaft will retract said shanks to retract said bits, an axially movable key between said shanks and between said bits fitted between said side walls and slidable inwardly of said bore from an outwardly extended position by engagement with the blind end of the hole, spring means in said bore normally urging said key into said outwardly extended position, said key having forwardly flaring opposite faces engaging the sides of the shanks to move said shanks laterally upon inward sliding of the key, means on said key engageable with the laterally extending ends of said shanks, and spring means coacting with said bits to yieldingly maintain the shanks engaged with said faces of the key.

References Cited in the file of this patent

UNITED STATES PATENTS

| Number | Name | Date |
|---|---|---|
| 679,384 | Kellerman | July 30, 1901 |
| 833,240 | Potter | Oct. 16, 1906 |
| 1,137,615 | Haugh | Apr. 27, 1915 |
| 1,149,512 | Haugh | Aug. 10, 1915 |
| 1,420,918 | Fehlman | June 27, 1922 |
| 1,740,829 | Nichols | Dec. 24, 1929 |
| 2,511,650 | Robinson | June 13, 1950 |